United States Patent [19]

Critten

[11] Patent Number: 4,634,222

[45] Date of Patent: Jan. 6, 1987

[54] NATURAL-LIGHT ILLUMINATION ENHANCEMENT ASSEMBLY

[75] Inventor: Donald L. Critten, Luton, England

[73] Assignee: National Research Development Corporation, London, England

[21] Appl. No.: 620,925

[22] Filed: Jun. 15, 1984

[30] Foreign Application Priority Data

Jun. 17, 1983 [GB] United Kingdom ............... 8316511

[51] Int. Cl.$^4$ .................................... G02B 27/00
[52] U.S. Cl. ...................................... 350/263
[58] Field of Search .......................... 350/258–265

[56] References Cited

U.S. PATENT DOCUMENTS

| 717,782 | 1/1903 | Wadsworth | 350/261 |
| 721,258 | 2/1903 | Wadsworth | 350/259 |
| 2,046,601 | 7/1936 | Atkinson | 350/263 X |
| 2,518,044 | 8/1950 | Mattison | 350/263 |
| 2,546,335 | 3/1951 | Friend | 350/263 |
| 2,857,634 | 10/1958 | Garbade et al. | 350/263 X |
| 4,128,307 | 12/1978 | Badertscher et al. | 350/263 |
| 4,411,493 | 10/1983 | Miller | 350/262 |

FOREIGN PATENT DOCUMENTS

| 721257 | 1/1955 | Denmark . |
| 213714 | 4/1924 | United Kingdom . |
| 371237 | 4/1932 | United Kingdom . |
| 1046959 | 10/1966 | United Kingdom . |
| 1148677 | 4/1969 | United Kingdom . |
| 1469155 | 3/1977 | United Kingdom . |
| 1535179 | 12/1978 | United Kingdom . |
| 2044328 | 10/1980 | United Kingdom . |

Primary Examiner—Richard A. Wintercorn
Attorney, Agent, or Firm—Cushman, Darby & Cushman

[57] ABSTRACT

A louvred reflector 10 (FIG. 1) comprises an array of wholly or partially reflecting louvres of which two adjacent louvres 12,13 are shown in the Figure. Each said louvre, when viewed short-edge on as shown in the Figure, comprises an inclined downwardly-facing concave first section 15 and a lower, less-steeply inclined, downwardly-facing concave second section 16. Light reflected by the louvres is downwardly directed over a considerable angular range to produce generally uniform illumination on either side of the reflector. In a second embodiment, the reflected light is directed to only one side of the reflector.

9 Claims, 3 Drawing Figures

NATURAL-LIGHT ILLUMINATION ENHANCEMENT ASSEMBLY

The present invention relates to an assembly for enhancing greehouse or factory illumination using natural light.

In past attempts at enhancing greenhouse illumination, a fully reflecting north wall has been provided to direct back on to the house floor sunlight which would otherwise have passed out through the north wall. Such an arrangement suffers from a number of disadvantages. For example, the illumination may not extend over the entire house floor; tall crops can obscure the reflecting surface; and unless the reflector can be removed, significant losses will occur under diffuse overcast conditions due to the obscuration of the north sky by the north wall of the house.

It is an object of the present invention to provide a natural-light illumination enhancement assembly in which the above disadvantages are overcome or at least significantly reduced.

According to the present invention, a natural-light illumination enhancement assembly comprises an array of wholly or partially reflecting louvres arranged to reflect natural light downwardly off their lower surfaces.

For convenience, this assembly will be hereinafter referred to as a louvred reflector, or, where convenient, simply as a reflector.

When the louvres are wholly reflecting, they can, if desired, be of any conventional shape.

In operation, the reflector of the present invention will be suspended in the greehouse so that natural light which otherwise would not fall on crop in the greehouse is reflected on to it by the assembly. For example, the assembly would be suspended from the highest point of a single-span greenhouse or along the north or most northernly side of the greenhouse.

The optimum vertical extent of the reflector will be governed by the maximum crop height and/or by the clearance required for access to the crop.

In the case of a single span greenhouse with the reflector hung from the highest point of the greenhouse, it is advantageous with the low sun angles experienced during the important winter months, that each louvre of the reflector should be carefully shaped to ensure that light will be directed downwardly over a considerable angular range to produce generally uniform illumination on either side of the reflector.

Accordingly, in a first embodiment of the invention, the assembly of the present invention comprises an array of wholly or partially reflecting louvres each of which, when viewed short-edge on, comprises an inclined downwardly-facing concave first section and a lower downwardly-facing concave second section which is less-steeply inclined than the first section and has about double the length of the first section when so viewed, both the first and the second sections lying on or close to respective 15° circular arcs and meeting one another at about 145° to define a downwardly-facing ridge-like portion, the vertical separation of like parts of adjacent louvres being about half the edge-to-edge dimension of each said louvre when so viewed.

In modifications of this embodiment, one or other or both of the two sections may have a curvature of other than 15° or it may be straight when viewed short-end on.

In a second embodiment of the invention, in which the assembly is designed to be hung at the south wall of the greenhouse to reflect light back through to the north side of the greenhouse, the assembly comprises an array of wholly or partially reflecting louvres each of which, when viewed short-edge on, comprises an inclined downwardly-facing straight or slightly concave first section merging tangentially into a lower inclined downwardly-facing second section of significantly greater curvature than the first section and of about double the length of the first section when so viewed, the second section lying on or close to a 15° circular arc and the vertical separation of like parts of adjacent louvres being about half the edge-to-edge dimension of each said louvre when so viewed.

In a third embodiment of the invention, an assembly according to the present invention comprises an array of wholly or partially reflecting louvres each of which, when viewed short-edge on, comprises an inclined downwardly-facing first section, pivotally connected to a downwardly-facing concave second section, the second section lying on or close to a 15° circular arc, when so viewed, and the first section being straight or lying on a second circular arc of the same or lesser curvature than the arc for the first section and the vertical separation of like parts of adjacent louvres being about half the edge-to-edge dimension of each said louvre when so viewed.

In all the statements of the invention given above and in the accompanying claims the term "about" is to be interpreted as meaning within plus or minus 20% of the values quoted.

The use of louvres which are partially reflecting and partially transmitting has the advantage of maintaining greenhouse illumination during overcast conditions by reflecting downwards, horizontal or near horizontal light received from the south.

Suitable surface materials for the fully or partially reflecting versions of the louvres include the usual commonly used reflecting materials such as aluminium, silver etc.

Embodiments of the invention will now be described, by way of example only, with reference to the accompanying drawings in which.

Figure 1:
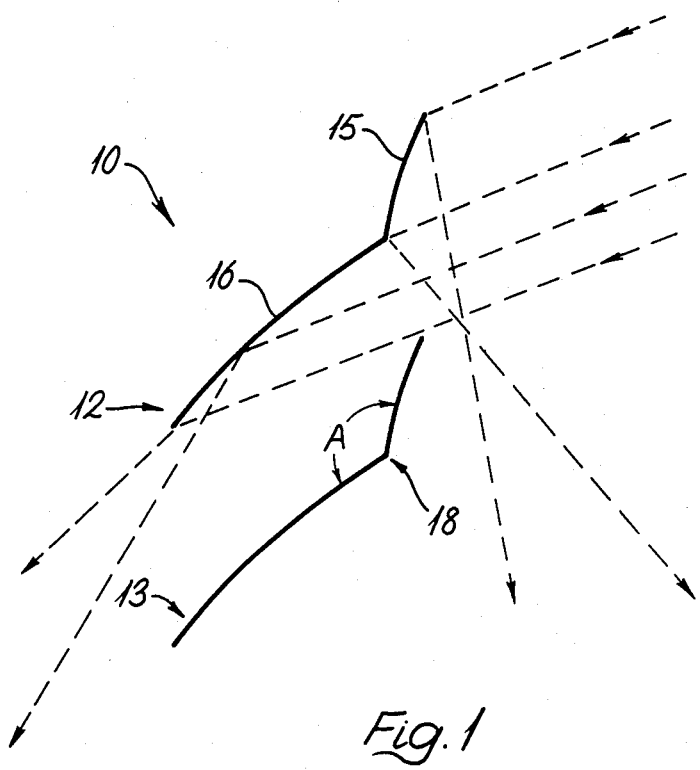
FIG. 1 is a simplified, somewhat diagrammatic, side view, looking short-edge on at part of a first embodiment of the invention.

Referring first to FIG. 1, a louvred reflector 10 according to the present invention comprises an array of wholly or partially reflecting louvres of which two adjacent louvres 12, 13 are shown in the Figure.

As viewed in the Figure, it will be seen that each louvre comprises an inclined downwardly-facing concave first section 15 and a lower, less-steeply inclined, downwardly-facing concave second section 16.

Both these sections lie on or close to respective 15° circular arcs i.e. arcs of an imaginary circle of a length such as to subtend an angle of 15° at the centre of that circle.

The two sections meet at an angle "A" of about 145° to define a downwardly-facing ridge-like portion 18.

The vertical separation of like parts of adjacent louvres will, as seen from the Figure, be about half the edge-to-edge dimension of the louvres.

The broken lines illustrate the path of light incident on and reflected from that portion of the reflector shown in the Figure. As shown, for low sun angles during the important winter months, light can be directed downwardly over a considerable angular range both north and south of the reflectors to provide a generally uniform illumination on each side of the reflector.

Since no light is reflected over a fairly narrow angle immediately below the reflector, it will be convenient to have the path through the greenhouse directly beneath the reflector. This may be the case in single-span greenhouses when the reflector is hung in its optimum operational position from the highest point in the greenhouse.

Figure 2:
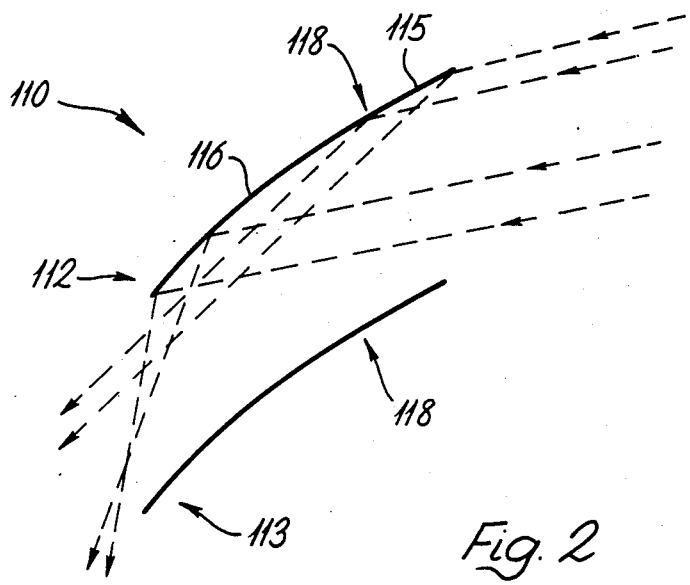
FIG. 2 is a simplified, somewhat diagrammatic, side view looking short-edge on of part of a second embodiment of the invention.

Turning now to FIG. 2, this shows part of a second design of louvred reflector 110 also comprising an array of wholly or partially reflecting louvres such as louvres 112, 113 in the portion illustrated.

As viewed in FIG. 2, it will be seen that each louvre now comprises an inclined downwardly-facing straight or slightly concave first section 115 merging tangentially into a lower inclined downwardly-facing concave second section 116 of significantly greater curvature than the first section and of about double the length of the first section when viewed as shown in FIG. 2. Arrow 118 indicates the point where the two sections merge together.

As before, the vertical separation of like parts of adjacent louvres is about half the edge-to-edge dimension of the louvres and the broken lines illustrate the path of light incident on and reflected from that portion of the reflector shown in the Figure.

In this latter respect, it will be noted that in contrast to the embodiment shown in FIG. 1 of the drawings, the embodiment shown in FIG. 2 operates to reflect light to only the one side of the reflector.

It is to be understood that in both the first and second embodiments, the various louvres may either be mounted so as to lie at a constant unchangeable angle to their supporting structure (not shown) or they may be mounted e.g. in any of the various ways already known and practiced for conventional venetian blind structures, to allow their orientations to be varied to suit different lighting situations. Indeed, if desired, the louvres of the two illustrated embodiments may be controlled by a microprocessor or small computer to vary the louvre inclination as required e.g. to produce a more even overall illumination or to reflect more or less light to one or other side of the reflector.

In a third embodiment (not shown) of the invention, the louvre sections are each of an overall shape similar to those used in the illustrated embodiments of their modifications but the two sections of each louvre are now interconnected by a respective pivot to allow one or each section to change its orientation relative to the other section.

As already explained in the general introduction, the relative dimensions, inclinations and separations of the different sections of the louvres can be varied from the quoted values to within plus or minus 20% without departing from the scope of the invention.

It should also be borne in mind that the reflectors of the present invention may have application in localities other than greenhouses e.g. in a factory or in any other situation where it would be advantageous to utilise natural light for the illumination and/or heating of the structure concerned.

Besides the advantage already given above for using only partially reflecting materials, it will be also be advantageous to use these materials in situations where a lower louvre may partially obscure its immediate upper neighbour or where, if a gap were left to avoid this, there would be a chance of light passing straight through this gap.

A convenient louvre for use in the embodiments of FIGS. 1 and 2 and their modifications might, for example, comprise an aluminium blade of 0.2 mm material thickness, a long-side length of 3 meters, a short-side length of 5 cm, and a reflecting layer of aluminium, silver or other suitable material deposited on the concave side of the louvre sections by conventional means.

It is to be understood, of course, that throughout the application, the references to the north and south sides of the greenhouse result from that fact that it is usual to have the major plan dimension of the greenhouse orientated in an east-west sense so as to make best use of the available natural light. The application further assumes that the greenhouse in which the reflector is to be fitted is in the northern hemisphere. If intended for use in the southern hemisphere, then the references to north and south should be interchanged throughout the Application.

Figure 3:
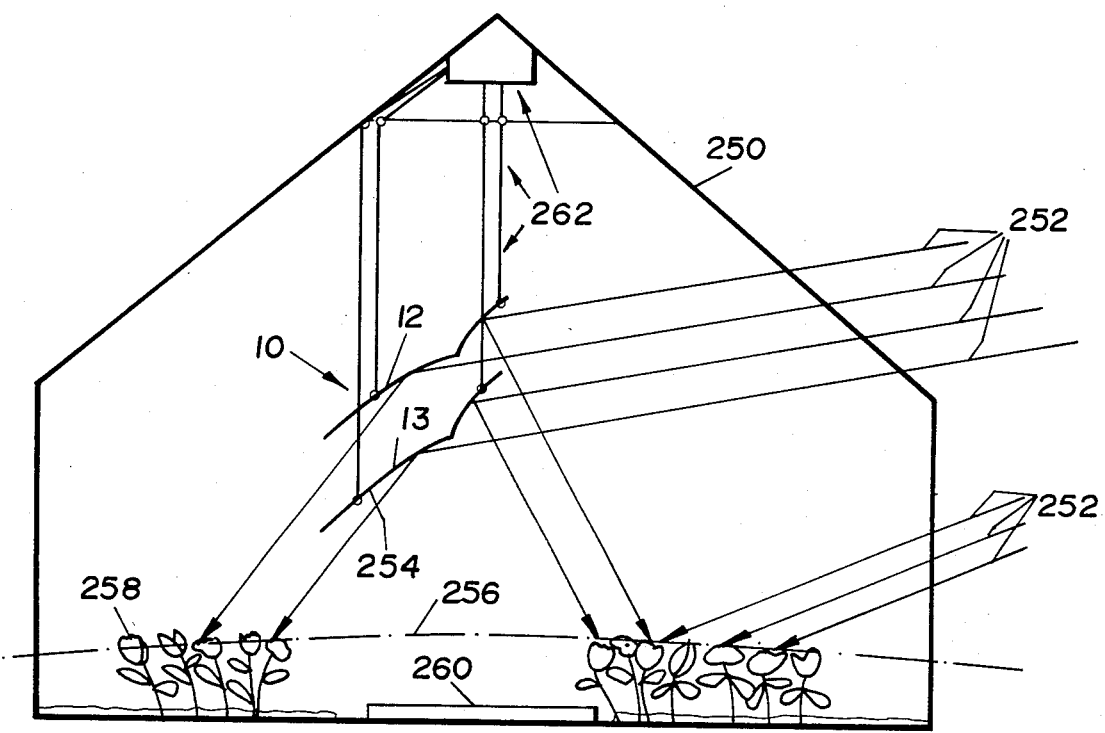
FIG. 3 is a schematic view of an array of reflective louvers, provided in accordance with principles of the present invention, mounted in a single span greenhouse for reflecting direct rays of the sun onto crops growing to the front and to the rear of a path located under the array.

In FIG. 3, an array 10 of louvers 12, 13 is suspended in a single span greenhouse 250, so that direct rays 252 of the sun striking the at least partially reflective under surfaces 254, can be reflected to a plane 256 located at a level below the array 10, in order to impinge upon a growing crop 258. As indicated above, where the reflectors are so arranged that light cannot be reflected to the band located immediately under the array, the greenhouse walkway 260 can make use of that region. The suspension system 262 may comprise motorized venetian blindlike suspension system in which the attitude of individual louvers may be adjusted, e.g. by a microprocessor.

I claim:

1. A natural-light illumination enhancement assembly, comprising:

a louver array including at least on louver;

each louver of said array having means defining an at least partially-reflective lower surface;

means mounting all of said louvers so as to have direct sunlight incident upon at least some of said at least partially reflective lower surface of each and for mounting each of said louvers in such relation to one another that at least some of said incident direct sunlight is reflected by each of said louvers from said at least partially reflective lower surface thereof to a notional plane disposed at a lower level than said louver array;

each of said at least partially reflecting louvers, when viewed short-edge on, comprising an inclined downwardly-facing concave first section and a lower downwardly-facing concave second section which is less-steeply inclined than the first section and having about double the length of the first section when so viewed, both the first and the second sections lying on or close to respective 15° circular arcs and meeting one another at about 145° to define a downwardly-facing ridge-like portion, the vertical separtion of like parts of adjacent said louvers being about half the edge-to-edge dimensions of each said louver when so viewed.

2. An assembly as claimed in claim 1 in which one or other or both of the two sections has a curvature of other than 15° or is straight when viewed short-end on.

3. An assembly as claimed in claim 1 in which the louvres are mounted in such a way as to allow their orientations to be varied to suit different lighting situations.

4. An assembly as claimed in claim 1 in which each said at least partially reflecting louver blade is of about 0.2 mm material thickness, has a long-side length of about 3 meters and has a short-side length dimension of about 5 cm.

5. A natural-light illumination enhancement assembly, comprising:
a louver array including at least one louver;
each louver of said array having means defining an at least partially-reflective lower surface;
means mounting all of said louvers so as to have direct sunlight incident upon at least some of said at least partially reflective lower surface of each and for mounting each of said louvers in such relation to one another that at least some of said incident direct sunlight is reflected by each of said louvers from said at least partially reflective lower surface thereof to a notional plane disposed at a lower level than said louver array;
each of said at least partially reflecting louvers, when viewed short-edge on, comprising an inclined downwardly-facing straight or slightly concave first section merging tangentially into a lower inclined downwardly-facing concave second section of significantly greater curvature than the first section and of about double the length of the first section when so viewed, the second section lying on or close to a 15° circular arc and the vertical separation of like parts of adjacent said louvers being about half the edge-to-edge dimension of each said louver when so viewed.

6. A natural-light illumination enhancement assembly, comprising:
a louver array including at least one louver;
each louver of said array having means defining an at least partially-reflective lower surface;
means mounting all of said louvers so as to have direct sunlight incident upon at least some of said at least partially reflective lower surface of each and for mounting each of said louvers in such relation to one another that at least some of said incident direct sunlight is reflected by each of said louvers from said at least partially reflective lower surface thereof to a notional plane disposed at a lower level than said louver array;
each of said at least partially reflecting louvers, when viewed short-edge on, comprising an inclined downwardly-facing first section pivotally connected to a downwardly-facing concave second section, the second section lying on or close to a 15° circular arc, when so viewed, and the first section being straight or lying on a second circular arc of the same or lesser curvature than the arc for the first section and the vertical separation of like parts of adjacent said louvers being about half the edge-to-edge dimension of each said louver when so viewed.

7. A natural-light illumination enhancement assembly, comprising:
a louver array including at least one louver;
each louver of said array having means defining an at least partially-reflective lower surface;
means mounting all of said louvers so as to have direct sunlight incident upon at least some of said at least partially reflective lower surface of each and for mounting each of said louvers in such relation to one another that at least some of said incident direct sunlight is reflected by each of said louvers from said at least partially reflective lower surface thereof to a notional plane disposed at a lower level than said louver array;
said louvers being mounted in such a way as to allow their orientations to be varied to suit different lighting conditions;
said louvers being controlled by a microprocessor or small computer to vary the louver inclination to produce a more even overall illumination or to reflect more or less light to one or another side of said at least partially reflective surface thereof.

8. A natural-light illumination enhancement assembly, comprising:
a louver array including at least one louver;
each louver of said array having means defining an at least partially-reflective lower surface;
means mounting all of said louvers so as to have direct sunlight incident upon at least some of said at least partially reflective lower surface of each and for mounting each of said louvers in such relation to one another that at least some of said incident direct sunlight is reflected by each of said louvers from said at least partially reflective lower surface thereof to a notional plane disposed at a lower level than said louver array;
at least some of said louvers being constructed of a partially reflecting material in situations where a lower louver may partially obscure its immediate upper neighbour or where, if a gap were left to avoid this, there would be a chance of light passing straight through this gap.

9. A natural-light illumination enhancement assembly comprising:
a greenhouse extending along an east-west axis, and having a south-facing wall adapted to admit direct sunlight throughout a substantial portion of the year;
a louver array including at least one louver;
each louver of said array having means defining an at least partially-reflective lower surface;
means mounting all of said louvers in said greenhouse so as to have direct sunlight incident upon at least some of said at least partially reflective lower surface of each and for mounting each of said louvers in such relation to one another that at least some of said incident direct sunlight is reflected by each of said louvers from said at least partially reflective lower surface thereof to a notional plane disposed at a lower level than said louver array;
each of said at least partially reflecting louvers, when viewed short-edge on, comprising an inclined downwardly-facing concave first section and a lower downwardly-facing concave second section which is less-steeply inclined than the first section and having about double the length of the first section when so viewed, both the first and the second sections lying on or close to respective 15° circular arcs and meeting one another at about 145° to define a downwardly-facing ridge-like portion, the vertical separation of like parts of adjacent said louvers being about half the edge-to-edge dimensions of each said louver when so viewed; and
an array of plants growing in said greenhouse at said level and being illuminated at least in part, by sunlight reflected directly onto them from said lower surfaces of said reflectors.

* * * * *